United States Patent
Kawamura et al.

(10) Patent No.: US 12,049,060 B2
(45) Date of Patent: Jul. 30, 2024

(54) MULTILAYERED POLYESTER RESIN-COATED METAL SHEET, MULTILAYERED POLYESTER RESIN FILM, AND CAN LID

(71) Applicant: TOYO KOHAN CO., LTD., Tokyo (JP)

(72) Inventors: Satoshi Kawamura, Kudamatsu (JP); Yuto Sato, Kudamatsu (JP); Yoshimi Ito, Kudamatsu (JP)

(73) Assignee: TOYO KOHAN CO., LTD., Tokyo (JP)

( * ) Notice: Subject to any disclaimer, the term of this patent is extended or adjusted under 35 U.S.C. 154(b) by 0 days.

(21) Appl. No.: 17/907,447

(22) PCT Filed: Mar. 23, 2021

(86) PCT No.: PCT/JP2021/011836
§ 371 (c)(1),
(2) Date: Sep. 27, 2022

(87) PCT Pub. No.: WO2021/200358
PCT Pub. Date: Oct. 7, 2021

(65) Prior Publication Data
US 2023/0132293 A1    Apr. 27, 2023

(30) Foreign Application Priority Data

Apr. 3, 2020  (JP) .................................. 2020-067721

(51) Int. Cl.
*B32B 15/09*  (2006.01)
*B32B 7/02*   (2019.01)
(Continued)

(52) U.S. Cl.
CPC ................ *B32B 15/09* (2013.01); *B32B 7/02* (2013.01); *B32B 15/18* (2013.01); *B32B 27/08* (2013.01);
(Continued)

(58) Field of Classification Search
CPC ......... B32B 15/00–15/20; B32B 27/32; B32B 27/36
See application file for complete search history.

(56) References Cited

U.S. PATENT DOCUMENTS

2005/0100749 A1    5/2005  Hu et al.
2006/0199023 A1*   9/2006  Funagi ........................ C08J 5/18
                                                           428/458

FOREIGN PATENT DOCUMENTS

EP    1186633 A2 *   3/2002  ............. B32B 15/09
JP    2001-341258 A  12/2001
(Continued)

OTHER PUBLICATIONS

Machine translation of WO2019077746. Retrieved Sep. 8, 2023.*
Machine translation of JP200503567. Retrieved Sep. 8, 2023.*

*Primary Examiner* — Prashant J Khatri
(74) *Attorney, Agent, or Firm* — BROWDY AND NEIMARK, PLLC

(57) ABSTRACT

The present invention provides a multilayered polyester resin-coated metal sheet having a metal substrate, a lower layer formed on at least one side of the metal substrate and made from a polyester resin (A) modified with 2 to 30 mol % of a first copolymerizable component, and an upper layer that is formed on the lower layer and that contains a polyester resin (B) and a soft component (C) incompatible with the polyester resin (B), the soft component (C) being
(Continued)

contained at a content of 2 to 50 mass % when the polyester resin (B) and the soft component (C) are assumed to amount to 100 mass % in total.

13 Claims, 1 Drawing Sheet

(51) Int. Cl.
    *B32B 15/18*     (2006.01)
    *B32B 27/08*     (2006.01)
    *B32B 27/18*     (2006.01)
    *B32B 27/36*     (2006.01)
    *B65D 65/40*     (2006.01)

(52) U.S. Cl.
    CPC .............. *B32B 27/18* (2013.01); *B32B 27/36* (2013.01); *B65D 65/40* (2013.01); *B32B 2264/1021* (2020.08); *B32B 2307/308* (2013.01); *B32B 2435/02* (2013.01)

(56) References Cited

FOREIGN PATENT DOCUMENTS

| | | | | |
|---|---|---|---|---|
| JP | 2002-347176 A | | 12/2002 | |
| JP | 2005035674 A | * | 2/2005 | |
| JP | 4236514 B2 | | 3/2009 | |
| WO | WO-2019077746 A1 | * | 4/2019 | ............... B05D 7/14 |

* cited by examiner

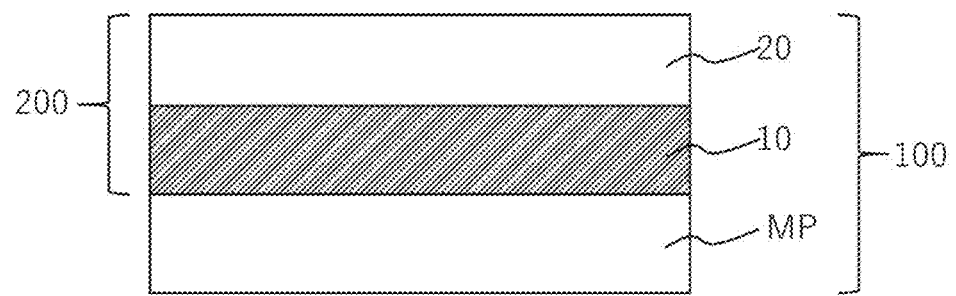

MULTILAYERED POLYESTER RESIN-COATED METAL SHEET, MULTILAYERED POLYESTER RESIN FILM, AND CAN LID

TECHNICAL FIELD

The present invention relates to a multilayered polyester resin-coated metal sheet, a multilayered polyester resin film for laminating a metal sheet, and a can lid using them.

BACKGROUND ART

As can lids for use in metal cans for beverage and foods, the stay-on type (SOT) that enables easy opening by hand and allows an opening portion to remain attached to a can body and easy-open (EO) lids such as the tear-off type that separates an opening portion and a can body are widely used conventionally.

As materials for such can lids, resin-coated metal sheets with a resin layer of a polyester resin or the like formed on a metal substrate of aluminum or steel are known.

As a requirement for a resin-coated metal sheet for use in can lids, the above-mentioned opening portion should enable smooth opening. For example, PTL 1 discloses a resin-coated metal sheet with objects of suppressing the occurrence of a feathering phenomenon and improving such characteristics as openability when formed into lids.

CITATION LIST

Patent Literature

[PTL 1]
 Japanese Patent No. 4236514

SUMMARY

Technical Problems

In the resin-coated metal sheet disclosed in PTL 1, a resin layer of a multilayer structure is disclosed as a resin layer laminated on a metal sheet. The resin layer has a lower layer of a thermoplastic polyester resin and an olefin polymer blended with the thermoplastic polyester resin and a surface layer in which a thermoplastic polyester has been controlled in crystallinity to have an elongation of 20%. As appreciated from the foregoing, the resin layer is multilayered to satisfy both corrosion resistance and processability in PTL 1. In the technique of this PTL 1, however, a problem still remains unsolved with respect to openability (feathering resistance).

Described specifically, as requirements for can lids using a resin-coated metal sheet, it is required to satisfy both the suppression of occurrence of a feathering phenomenon at the time of opening (openability) and the suppression of occurrence of film cracks on the can lids (processability) as described above.

Concerning openability, a resin layer is cut along a score line formed in a can lid, when opening the can lid. It is hence required to avoid occurrence of delamination between a metal substrate and the resin layer at an opening portion and a phenomenon that a stretched inside coating resin remains around the opening portion (feathering phenomenon). For an improvement in this openability, there may be a need to reduce the softness (elongation) of the resin to some extent.

As to processability, on the other hand, the resin layer is needed to be adaptable to the above-described processing on the metal substrate because rib processing for reinforcement and bulging drawing of a rivet portion are typically applied to the can lid in addition to scoring. Moreover, it is also necessary to avoid the occurrence of film cracks, delamination, or the like at locations where processing is performed to a large extent as described above, when the above-described processing is applied in a heat treatment step such as printing. For making an improvement in such processability, the resin to be used is needed to be somewhat soft.

In other words, the above-mentioned processability and openability can be considered to be mutually contradictory characteristics, so that there is an outstanding demand for the development of a resin capable of satisfying these characteristics together in can lids that use a resin-coated metal sheet.

Obviously, it is also necessary, as common problems for can lids, to have performance of suppression of resin delamination through retort processing after content filling (adhesion) and suppression of corrosion of a metal substrate after aging (corrosion resistance).

The present inventors conducted a diligent study to solve the above-described problems. As a result, it has been found that the above-described problems can be both satisfied at high levels by specifying the configuration of resin layers in a multilayered polyester resin film and a multilayered polyester resin-coated metal sheet for the manufacture of can lids, thereby leading to the contemplation of the present invention.

Solution to Problems

To achieve the above-described object, (1) a multilayered polyester resin-coated metal sheet according to an embodiment of the present invention is characterized in that it includes a metal substrate and a multilayered polyester resin layer formed on at least one side of the metal substrate, and the multilayered polyester resin layer has, in an order from a side of the metal substrate, a lower layer made from a polyester resin (A) modified with 2 to 30 mol % of a first copolymerizable component, and an upper layer containing a polyester resin (B) and a soft component (C) incompatible with the polyester resin (B), the soft component (C) being contained at a content of 2 to 50 mass % when the polyester resin (B) and the soft component (C) are assumed to amount to 100 mass % in total.

(2) Preferably, in the multilayered polyester resin-coated metal sheet described above in (1), the polyester resin (B) is a thermoplastic polyester resin having a glass transition temperature (Tg1) of 60° C. or higher but 90° C. or lower, the soft component (C) is one of or both a polyester-based thermoplastic elastomer and a polyolefin, the soft component (C) is disperse d in the polyester resin (B), and an absolute value ΔTg of a difference between the glass transition temperature (Tg1) of the polyester resin (B) and a glass transition temperature (Tg2) of the upper layer may satisfy the following equation (1):

$$\Delta Tg < 0.5 \times W \quad (1)$$

where W means the content (mass %) of the soft component (C) in the upper layer.

(3) Preferably, in the multilayered polyester resin-coated metal sheet described above in (1) or (2), the soft component (C) is dispersed in an island form in the polyester resin (B), and the soft component (C) dispersed in the island form may have an average major diameter of 0.1 to 5.0 μm and an average minor diameter of 0.01 to 2 μm.

(4) Preferably, in the multilayered polyester resin-coated metal sheet described above in any one of (1) to (3), the polyester resin (A) is principally made of polyethylene terephthalate, and may contain isophthalic acid as the first copolymerizable component.

(5) Preferably, in the multilayered polyester resin-coated metal sheet described above in (4), the lower layer may further contain 0.01 to 0.5 mol % of a polyfunctional component.

(6) Preferably, in the multilayered polyester resin-coated metal sheet described above in any one of (1) to (5), the polyester resin (A) may have a weight average molecular weight of 40000 to 80000.

(7) Preferably, in the multilayered polyester resin-coated metal sheet described above in any one of (1) to (6), inorganic particles having an average particle size of 0.2 to 5.0 μm is contained at 0.1 to 5.0 mass % in the polyester resin (A).

(8) Preferably, in the multilayered polyester resin-coated metal sheet described above in any one of (1) to (7), the upper layer and the lower layer may have a total thickness of 10 to 50 μm, the upper layer may have a thickness of 5 to 40 μm, and the lower layer may have a thickness of 5 to 30 μm.

(9) Preferably, in the multilayered polyester resin-coated metal sheet described above in any one of (1) to (8), the lower layer may have an elongation at break of 50% or less in an environment of 50° C. after heat treatment at 185° C. for 10 minutes.

(10) Preferably, the multilayered polyester resin-coated metal sheet described above in any one of (1) to (9) may further include a surface layer including polyester resin formed on a side of the upper layer, the side being opposite to the side of the metal substrate.

Also, to achieve the above-described object, (11) a multilayered polyester resin film according to an embodiment of the present invention is characterized in that it includes a lower layer formed on at least one side of a metal substrate and made from a polyester resin (A) modified with 2 to 30 mol % of a first copolymerizable component, and an upper layer that is formed on the lower layer and that contains a polyester resin (B) and a soft component (C) incompatible with the polyester resin (B), the soft component (C) being contained at a content of 2 to 50 mass % when the polyester resin (B) and the soft component (C) are assumed to amount to 100 mass % in total.

Also, to achieve the above-described object, (12) a can lid according to an embodiment of the present invention is characterized in that it uses the multilayered polyester resin-coated metal sheet described above in any one of (1) to (10).

Also, to achieve the above-described object, (13) a can lid according to another embodiment of the present invention is characterized in that it uses the multilayered polyester resin film described above in (11).

Advantageous Effects of Invention

According to the present invention, it is possible to realize a multilayered polyester resin-coated metal sheet, a multilayered polyester resin film, and a can lid, all of which satisfy the suppression of film cracks around a rivet portion arranged on the can lid (processability) at a high level, in addition to openability at the time of opening, which is suited for use, for example, in can lids. With the multilayered polyester resin-coated metal sheet, the multilayered polyester resin film, and the can lid according to the present invention, it is also possible to have respective performance of the suppression of resin delamination through retort processing after content filling (adhesion) and the suppression of corrosion of the metal substrate after aging (corrosion resistance).

BRIEF DESCRIPTION OF DRAWING

FIG. 1 is a schematic diagram illustrating a cross-section of a multilayered polyester resin-coated metal sheet 100 of the present embodiment.

DESCRIPTION OF EMBODIMENT

With use of an embodiment, a description will hereinafter be made of a multilayered polyester resin-coated metal sheet, a multilayered polyester resin film, and a can lid according to the present invention, but the present invention should not be limited to the following embodiment.
[Multilayered Polyester Resin-Coated Metal Sheet]

A multilayered polyester resin-coated metal sheet 100 of the present embodiment will first be described using FIG. 1. The multilayered polyester resin-coated metal sheet 100 of the present embodiment has a metal substrate MP and a multilayered polyester resin layer 200 formed on at least one side of the metal substrate MP. The multilayered polyester resin layer 200 in turn includes a lower layer 10 and an upper layer 20, which are formed in this order on the metal substrate MP.

In other words, the multilayered polyester resin-coated metal sheet 100 of the present embodiment has the metal substrate MP, the lower layer 10 formed on at least one side of the metal substrate MP, made from a polyester resin (A) modified with 2 to 30 mol % of a first copolymerizable component, and located on a side closer to the metal substrate MP, and the upper layer 20 that is formed on the lower layer 10 (on a side opposite to the side of the metal substrate MP) and that contains a polyester resin (B) and a soft component (C) incompatible with the polyester resin (B), the soft component (C) being contained at a content of 2 to 50 mass % when the polyester resin (B) and the soft component (C) are assumed to amount to 100 mass % in total.

It is to be noted that the multilayered polyester resin-coated metal sheet 100 of the present embodiment is not limited to the two-layer structure of the lower layer 10 and the upper layer 20 as illustrated in FIG. 1, and may have a structure of three or more layers as will be described in detail later.

<Metal Substrate>

As the metal substrate MP for use in the multilayered polyester resin-coated metal sheet 100 of the present embodiment, a known metal substrate MP such as an aluminum material or a steel sheet, which has conventionally been used in easy-open lids, can be used.

As the aluminum material, pure aluminum or an aluminum alloy is used. The aluminum material may have a thickness generally in a range of 0.20 to 0.50 mm, notably 0.23 to 0.30 mm, though it differs according to the size or the like of the lid. Further, a surface treatment film may be formed on a surface of the aluminum material by chromate treatment, zirconium treatment, phosphate treatment, polyacrylate treatment, or the like.

As the steel sheet, a variety of known steel sheets such as chromate surface-treated steel sheets, e.g., tin free steel (TFS) and tinned steel sheets subjected to plating treatment at a tin coating mass of 0.3 to 2.8 g/m² can preferably be used, for example. The steel sheet may desirably have a thickness in a range of 0.1 to 0.4 mm, notably 0.12 to 0.35 mm.

<Lower Layer>

A description will next be made of the lower layer 10 in the multilayered polyester resin-coated metal sheet 100 of the present embodiment. As illustrated in FIG. 1, the lower layer 10 is formed on at least one side of the metal substrate MP. Of the lower layer 10 and the upper layer 20 in the multilayered polyester resin layer 200 to be described subsequently herein, the lower layer 10 is formed closer to the metal substrate MP.

The polyester resin (A) used in the lower layer 10 in the multilayered polyester resin-coated metal sheet 100 of the present embodiment is a copolymer polyester resin, and has been modified with 2 to 30 mol % of a first copolymerizable component. Described specifically, the polyester resin (A) is preferably a copolymer resin made principally of polyethylene terephthalate.

As the above-mentioned first copolymerizable component, examples include at least one copolymerizable component selected from the group consisting of isophthalic acid (IA), orthophthalic acid, p-(β-hydroxyethoxy)benzoic acid, naphthalene-2,6-dicarboxylic acid, diphenoxyethane-4,4'-dicarboxylic acid, 5-sodiumsulfoisophthalic acid, hexahydroterephthalic acid, adipic acid, sebacic acid, trimellitic acid, and pyromellitic acid. Among these, isophthalic acid is preferred as the above-described first copolymerizable component from viewpoints of processability and adhesion.

Such a first copolymerizable component is preferably contained at 2 to 30 mol % in the copolymer polyester resin in the lower layer 10. If the first copolymerizable component amounts to lower than 2 mol %, the adhesion between the metal substrate MP and the lower layer 10 may be reduced. Such a low content is hence not preferred. If the first copolymerizable component exceeds 30 mol %, on the other hand, in addition to economic disfavor, the lower layer 10 may be reduced in film forming properties and barrier properties. Such a high content is hence not preferred.

More preferably, the amount of the first copolymerizable component in the copolymer polyester resin in the lower layer 10 is 5 to 15 mol %.

As the glycol component contained in the copolymer polyester resin for use in the lower layer 10 in the multilayered polyester resin-coated metal sheet 100 of the present embodiment, examples include one or more of ethylene glycol, and in addition, propylene glycol, 1,4-butanediol, diethylene glycol, 1,6-hexylene glycol, cyclohexane dimethanol, ethylene oxide adduct of bisphenol A, and the like.

Preferably, a second copolymerizable component (polyfunctional component) different from the above-described first copolymerizable component is further contained at 0.01 to 0.5 mol % in the copolymer polyester resin in the lower layer 10 of the present embodiment. This polyfunctional component is introduced to include crosslinking structures such that the openability is improved. If the content of this second copolymerizable component (polyfunctional component) exceeds 0.5 mol %, such a high content is not preferred for its tendency of occurrence of a gel in the copolymer polyester resin in the lower layer 10, and also from an economic viewpoint.

As the polyfunctional component, examples include one or more polyfunctional components selected from trimellitic acid, trimellitic anhydride, pyromellitic acid, pyromellitic anhydride, trimethylolpropane, and pentaerythritol. Among these, trimellitic acid (TMA) or pentaerythritol is particularly preferred from a viewpoint of availability or the like.

The copolymer polyester resin in the lower layer of the present embodiment preferably has a weight average molecular weight of 40000 to 80000 from a viewpoint of viscosity adjustment of the resin in the lower layer, a viewpoint of an improvement in openability, and the like. If the weight average molecular weight is lower than 40000, the resin layer may be reduced in film forming properties. Such a low weight average molecular weight is hence not preferred. If the weight average molecular weight exceeds 80000, on the other hand, an excessively high torque may occur in a kneader during formation of a film as the resin layer. Such a high weight average molecular weight is hence not preferred. A weight average molecular weight of 40000 to 55000 is more preferred from similar viewpoints.

The copolymer polyester resin in the lower layer in the present embodiment preferably contains 0.1 to 5.0 mass % of inorganic particles having an average particle size of 0.2 to 5.0 μm from viewpoints of improvements in the winding shape of a film, prevention of occurrence of wrinkles in a film, improvements in lid openability, and the like. As these inorganic particles, what is generally called "lubricant" can be used.

If a method (also called "direct coating" or the like) is adopted to manufacture a resin-coated metal sheet by directly extruding molten resins onto a metal substrate, stable production is feasible even if the above-described inorganic particles are not contained in the lower layer.

Described specifically, it is possible to use a commercially available, general lubricant such as an organic lubricant exemplified by an aliphatic hydrocarbon, a higher fatty acid alcohol, a fatty acid, a fatty acid metal salt, or a fatty acid ester or amide derivative, for example, stearamide, oleamide, erucinamide, erucamide, behenamide, or ethylenebisoleamide, or an inorganic lubricant exemplified by a silica-based lubricant such as silicon dioxide, aluminum silicate, or magnesium silicate, zeolite, calcium carbonate, silicon dioxide, aluminum oxide, or barium sulfate.

As the particle size of these inorganic particles, the average particle size of 0.2 to 5.0 μm is preferred as mentioned above, with an average particle size of 1.0 to 3.0 μm being more preferred. As the content of these inorganic particles, they are contained preferably at 0.1 to 5.0 mass %, more preferably at 0.4 to 3.0 mass %, in the copolymer polyester resin in the lower layer in the present embodiment.

The lower layer 10 in the present embodiment preferably has an elongation at break of 50% or less in an environment of 50° C. after heat treatment at 185° C. for 10 minutes.

Described specifically, the multilayered polyester resin-coated metal sheet of the present embodiment is subjected to heat treatment during printing and retort processing in the course of the manufacture of can lids. It is generally known that in a resin, the elongation at break after heat treatment is lowered compared with the elongation at break before the heat treatment. In the present invention, it has been found that, when the elongation of the film at break is 50% or less at a specific temperature (under the environment of 50° C.) after the heat treatment under the above-described conditions, the resulting can lids can assure stable openability and can also satisfy such requirements as processability even in areas with high temperature.

<Upper Layer>

A description will next be made of the upper layer 20 in the multilayered polyester resin-coated metal sheet 100 of the present embodiment. As illustrated in FIG. 1, the upper layer 20 is formed on a side of the above-mentioned lower layer 10 opposite to the metal substrate MP. In other words, the lower layer 10 and the upper layer 20 are formed one after the other in this order from the metal substrate MP. If the lower layer 10 is taken as a middle layer, it can also be said that the metal substrate MP is formed on one side of the lower layer 10 and the upper layer 20 is formed on the other side of the lower layer 10.

In the case of being used for a can lid, it is preferred to manufacture the can lid such that the upper layer 20 will be placed on the side of contents of a can.

The resin composition of the upper layer 20 contains the polyester resin (B) as a principal component and the soft component (C) incompatible with the polyester resin (B). Further, as the amount of the soft component (C) to be contained, the content of the soft component (C) is 2 to 50 mass % when the polyester resin (B) and the soft component (C) are assumed to amount to 100 mass % in total.

It is to be noted that, in the foregoing, the component with a highest content (mass percent) among solid components forming the upper layer 20 (involatile components other than volatile substances such as water and solvent) is defined as a "principal component."

If the content of the soft component (C) is lower than 2 mass %, the processability of the multilayered polyester resin-coated metal sheet of the present embodiment may be reduced. Such a low content is hence not preferred. If the content of the soft component (C) exceeds 50 mass %, on the other hand, the openability may be reduced when formed into can lids. Such a high content is hence not preferred. In the present embodiment, the content of the soft component (C) is more preferably 5 to 20 mass %.

The above-described polyester resin (B) is preferably a thermoplastic polyester resin from viewpoints of heat resistance and impact resistance. Specific examples of the thermoplastic polyester resin include, for example, polyethylene terephthalate (PET), polyethylene isophthalate, and polyesters obtained by copolymerizing these polyethylene terephthalate and polyethylene isophthalate with dicarboxylic acid components such as aromatic dicarboxylic acids exemplified by isophthalic acid, terephthalic acid, 2,6-naphthalenedicarboxylic acid, diphenyldicarboxylic acid, diphenylsulfonedicarboxylic acid, diphenoxyethanedicarboxylic acid, diphenyl ether dicarboxylic acid, 5-sulfoisophthalic acid, and phthalic acid, aliphatic dicarboxylic acids exemplified by oxalic acid, succinic acid, adipic acid, sebacic acid, dimer acid, maleic acid, and fumaric acid, and alicyclic dicarboxylic acids exemplified by cyclohexanedicarboxylic acid; aliphatic glycols exemplified by ethylene glycol, triethylene glycol, polyethylene glycol, polytetramethylene glycol, propanediol, butanediol, pentanediol, hexanediol, and neopentyl glycol; aromatic glycols exemplified by bisphenol A and bisphenol S; and alicyclic glycols exemplified by cyclohexanedimethanol. The above-mentioned thermoplastic resins may be used either singly or in combination with two or more types.

Among these thermoplastic polyesters, a thermoplastic polyester made from ethylene terephthalate and/or ethylene isophthalate as a principal component is preferred from viewpoints of cost, flavor, and the like. The term "principal component" as used here means that units derived from the terephthalic acid component or isophthalic acid component as a dicarboxylic acid component in ethylene terephthalate and/or ethylene isophthalate account for 50 mol % or more of units derived from all dicarboxylic acid components.

In the thermoplastic polyester for use as the polyester resin (B), a polyfunctional component selected from trifunctional or higher functional polybasic acids and polyhydric alcohols may also have been copolymerized. The copolymerization of such a polyfunctional component is preferred because it reduces draw resonance (wavy edges) that, when a film is manufactured at a high speed or a laminated metal sheet is manufactured by directly laminating a molten film onto a metal sheet at a high speed, the film is waved at edge portions (edges) to result in variations in thickness. As the polyfunctional component selected from the trifunctional or higher functional polybasic acids and polyhydric alcohols, examples include trimellitic acid, trimellitic anhydride, pyromellitic acid, pyromellitic anhydride, trimethylolpropane, pentaerythritol, and the like. The content of such a polyfunctional component is 0.01 to 0.5 mol %, preferably 0.07 to 0.3 mol %, in the thermoplastic polyester. If the content of the polyfunctional component is in the above-described range, draw resonance reducing effect can appropriately be enhanced while occurrence of gelation in the thermoplastic polyester is suppressed.

The above-described polyester resin (B) used in the upper layer 20 has a glass transition temperature (Tg1) of preferably 60° C. or higher but 90° C. or lower, more preferably 65° C. to 85° C., and still more preferably 70° C. to 80° C. If Tg1 is lower than 60° C., the resulting film is reduced in heat resistance, and may be reduced in flavor characteristics. Such a low Tg1 is hence not preferred. If Tg1 exceeds 90° C., on the other hand, the resulting film may be reduced in processability and impact resistance. Such a high Tg1 is hence not preferred.

As a measurement method of glass transition temperatures, a known method can be applied. Using a differential scanning calorimeter (DSC), for example, allows measurement at a ramp-up rate of 10° C./min.

The thermoplastic polyester used as the polyester resin (B) has an intrinsic viscosity [η] of preferably 0.5 to 1.4 dL/g, more preferably 0.7 to 1.2 dL/g, and still more preferably 0.8 to 1.0 dL/g. Intrinsic viscosity [η] is defined to be a value obtained by dissolving a sample in a 1:1 mixed solvent of phenol and 1,1,2,2-tetrachloroethane, and making measurement at 30° C. The setting of the intrinsic viscosity [η] in the above-described range enables enhancement of the formability still higher when forming the thermoplastic polyester into a film, while providing the resulting film with good impact resistance.

A description will next be made of the soft component (C), which is blended with the polyester resin (B) as the principal component in the upper layer 20 in the present embodiment, and is incompatible with the polyester resin (B). It is to be noted that the term "incompatible" as used here means a state in which boundaries can be seen between the polyester resin (B) and the soft component (C) when the upper layer 20 is observed.

The soft component (C) in the upper layer 20 in the present embodiment is one that, when blended with the above-mentioned polyester resin (B) as the principal component, is finely dispersed and can form a sea-island structure (phase separation). Further, the soft component (C) at room temperature can impart rubber elasticity to the polyester resin (B) as the principal component. Furthermore, the soft component (C) preferably does not substantially affect the glass transition temperature (Tg) of the polyester resin (B) when blended with the polyester resin (B) as the principal component.

From these viewpoints, specifically, either one of or both a polyester-based thermoplastic elastomer and a polyolefin can be used as the soft component (C) in the present embodiment.

As the polyester-based thermoplastic elastomer for use as the soft component (C), one having a glass transition temperature (Tg) of room temperature (25° C.) or lower is preferred, with one having a glass transition temperature (Tg) of lower than 20° C. being more preferred, and one having a glass transition temperature (Tg) of 10° C. or lower being still more preferred. It is to be noted that the lower limit of the glass transition temperature (Tg) of the polyester-based thermoplastic elastomer for use in the present embodiment is not particularly limited to any value, but is preferably −50° C. or higher.

The above-described polyester-based thermoplastic elastomer has a structure formed from hard segments, which generally form a hard crystal structure, and soft segments. As a component that constitutes the hard segments in the polyester-based thermoplastic elastomer for use in the present embodiment, examples include terephthalic acid, isophthalic acid, bisphenol A, bisphenol S, 2,6-naphthalenedicarboxylic acid, ethylene glycol, 1,4-butanediol, and the like.

As a component that constitutes the soft segments, on the other hand, examples include aliphatic dicarboxylic acids such as adipic acid, sebacic acid, and dimer acid, aliphatic diols such as 1,6-hexanediol, 1,8-octanediol, and 1,10-decanediol, and polyethers such as polyethylene glycol and polytetramethylene glycol. Among these, polyethers are preferred, with polytetramethylene glycol being particularly preferred among the polyethers.

As preferred polyester-based thermoplastic elastomers, examples include polyether esters in each of which hard segments of a dicarboxylic acid and soft segments of polyether units are bound via ester bonds. Among these, those containing polyether units at 50 mass % or higher in the polyester-based thermoplastic elastomers are preferred. The content of polyether units in each polyester-based thermoplastic elastomer is more preferably 50 to 70 mass %. If the content of the polyether units is lower than 50 mass %, the polyester-based thermoplastic elastomer is susceptible to compatibilization when melted and kneaded together with the thermoplastic polyester. The resulting film is reduced in heat resistance, and hence, such a low content is not preferred.

No particular limitation is imposed on the molecular weight of the polyether units (polyether segments) in the polyester-based thermoplastic elastomer, and those containing polyether units of 500 to 5000 molecular weight are preferably used. For an improvement in the adhesion with the metal, the polyester-based thermoplastic elastomer may also be modified with maleic anhydride or the like. It is to be noted that the polyester-based thermoplastic elastomer is required to contain at least one polyether unit and may contain multiple polyether units.

As a polyester-based thermoplastic elastomer particularly preferred in the present embodiment, examples include a resin obtained by copolymerizing polytetramethylene glycol (PTMG) with polybutylene terephthalate.

A description will next be made of the polyolefin as the soft component (C) in the upper layer 20 in the present embodiment. As the polyolefin for use as the soft component (C), examples include chain polyolefin resins such as low-density polyethylene, medium-density polyethylene, high-density polyethylene, polypropylene, poly(1-butene), and poly(4-methyl-1-pentene), and random copolymers and block copolymers of α-olefins themselves such as ethylene, propylene, 1-butene, and 4-methyl-1-pentene, led by ethylene/propylene copolymer. It is also possible to use what are generally called acid-modified polyolefins obtained by graft polymerizing 2% or less of unsaturated carboxylic acids, such as acrylic acid, methacrylic acid, maleic acid, fumaric acid, and itaconic acid, or their anhydrides with any of these polyolefins. Ethylene vinyl acetate (EVA), ethylene-vinyl alcohol copolymer (EVOH), and the like can also be used.

From a viewpoint of film forming properties, the above-described polyolefins preferably have a melt flow rate (hereinafter simply called "MFR") of 30 g/10 min or lower.

Moreover, an ionomer resin (ion-crosslinked olefin copolymer) in which, in any one of the above-described polyolefins, some or all of carboxyl groups have been ion-crosslinked with metal cations or the like can also be used.

An ionomer resin is an ionic salt in which some or all of carboxyl groups in a copolymer of ethylene and an α,β-unsaturated carboxylic acid have been neutralized with metal cations, and the degree of its neutralization, in other words, its ion concentration, affects its physical properties. Typically, the melt flow rate (hereinafter simply called "MFR") of an ionomer resin depends on its ion concentration, and the higher the ion concentration, the smaller the MFR. On the other hand, its melting point depends on its carboxyl group concentration, and the higher the carboxyl group concentration, the lower the melting point. Desired as an ionomer resin for use in the present invention is hence, but of course is not limited to, one having an MFR of 15 g/10 min or lower, notably in a range of 5 g/10 min to 0.5 g/10 min, and a melting point of 100° C. or lower, notably in a range of 97° C. to 80° C.

As the metal cations in the ionomer resin, examples include Na+, K+, Li+, Zn+, Z2+, Mg2+, Ca2+, Co2+, Ni2+, Mn2+, Pb2+, Cu2+, and the like. In the present embodiment, one neutralized especially with zinc can suitably be used as its crosslinking degree is high and its moisture susceptibility is low. Further, some of remaining carboxyl groups which are not neutralized with metal ions may be esterified with a lower alcohol.

As a relation between the glass transition temperature (Tg1) of the above-described polyester resin (B) and the glass transition temperature (Tg2) after blending the soft component (C) with the polyester resin (B) as the principal component in the upper layer 20 in the present embodiment, it is preferred to satisfy the following equation (1):

$$\Delta Tg < 0.5 \times W \qquad (1)$$

where W means the content (mass %) of the soft component (C) in the upper layer 20, and $\Delta Tg$ is the absolute value of the difference between Tg1 and Tg2.

As a result of the diligent study by the present inventors, it has been found that what is generally called a "sea-island structure" with the soft component (C) dispersed in an island form in the polyester resin (B) in the upper layer is formed when the soft component (C) is blended with the polyester resin (B) as the principal component in the upper layer 20. It has also been found that the soft component (C) is incompatible with the polyester resin (B) in the structure and the satisfaction of the above-described equation (1) as to the content of the soft component (C) suppresses a change in Tg after the blending of the soft component and fulfills openability and processability.

If $\Delta Tg$ is equal to or greater than 0.5×W in the above-described equation (1), an increase in the content of the polyester-based thermoplastic elastomer for an improvement in impact resistance leads to a decrease in the Tg and a reduction in the heat resistance of the resulting film, so that impact resistance and heat resistance cannot be satisfied together in the film.

Particularly preferred is preferably to satisfy the following formula (2):

$$\Delta Tg < 0.2 \times W \qquad (2)$$

It is also preferred that in the upper layer of the multilayered polyester resin film in the present embodiment, the soft component (C) is dispersed in an island form in the polyester resin (B) in the upper layer, and the soft component dispersed in the island form has an average major diameter of 0.1 to 5.0 μm and an average minor diameter of 0.01 to 2 μm.

If the value of either the average major diameter or the average minor diameter in the above-described average major diameter and average minor diameter exceeds the above-described numerical range, the soft component is large in dispersed particle size and also large in aspect ratio, thereby possibly leading to reduced openability when manufactured into can lids. Such a large average major diameter or minor average diameter is hence not preferred.

To the multilayered polyester resin film of the present embodiment, one or more of additives such as light stabilizers, impact modifiers, compatibilizers, lubricants, plasticizers, antistatic agents, reaction catalysts, coloration preventives, radical inhibitors, end sequestering agents, antioxidants, heat stabilizers, parting agents, flame retardants, antibacterials, and antifungals may be added.

A description will next be made of the thickness of the multilayered polyester resin layer 200 in the present embodiment. The thickness of the multilayered polyester resin layer 200 in the present embodiment may preferably be in a range of 10 to 50 μm. Any thickness of the multilayered polyester resin layer 200 greater than 50 μm is not preferred from the viewpoint of economy and the viewpoint of openability. On the other hand, any thickness of the multilayered polyester resin layer 200 smaller than 10 μm may lead to reduction in processability and barrier properties when formed into can lids, and hence is not preferred.

In the multilayered polyester resin layer 200 in the present embodiment, the lower layer 10 and the upper layer 20 preferably have a thickness ratio (lower layer:upper layer) in a range of 1:5 to 3:1 in satisfying both openability and processability. Described specifically, if the lower layer is thicker beyond the above-described range, the openability and impact resistance may become insufficient. If the lower layer is thinner beyond the above-described range, on the other hand, the processability and corrosion resistance may become insufficient. More preferably, the thickness ratio of the lower layer 10 to the upper layer 20 (lower layer:upper layer) is in a range of 1:3 to 1:1.

The thicknesses of the individual layers are not specifically limited to the ones described above. Preferably, however, the upper layer 20 is in a range of 5 to 40 μm, notably 5 to 15 μm. If the upper layer 20 is thinner than 5 μm, the processability may be reduced when formed into can lids. Such a small thickness is hence not preferred.

On the other hand, the lower layer 10 is in a range of preferably 5 to 30 μm, notably 10 to 25 μm. If the lower layer 10 is thinner than 5 μm, the openability as a can lid may be reduced. Such a small thickness is hence not preferred.

The multilayered polyester resin layer 200 in the present embodiment may be one including a layer other than the lower layer 10 and upper layer 20 mentioned above. Described specifically, as mentioned above, it is preferred for the multilayered polyester resin layer 200 in the present embodiment that, in the case of being used for a can lid, the can lid is manufactured such that the upper layer 20 will be placed on a side closer to contents of the can. In this case, a surface layer 30 made from a polyester resin can be arranged further, for example, on a side of the upper layer 20 (on the side closer to the contents of the can), the side being opposite to the side of the metal substrate. It is possible to make improvements in the flavor characteristics of the film by arranging, for example, a polyethylene terephthalate layer as the surface layer 30, or to make improvements in the barrier properties of the film by arranging, for example, a polyethylene naphthalate layer as the surface layer 30.

In the present embodiment, it is preferred to form the surface layer 30 for making improvements in flavor characteristics, specifically, for preventing flavor changes of canned contents or for preventing adsorption of aroma components contained in the canned contents. For these purposes, the polyethylene terephthalate layer is preferred as the surface layer 30 in the present embodiment. The polyethylene terephthalate layer as the surface layer 30 may contain a copolymerizable component, and may contain, for example, isophthalic acid at 5 mol % or less. The thickness of such a surface layer 30 is preferably in a range of 0.1 to 10 μm.

[Manufacturing Method of Multilayered Polyester Resin-Coated Metal Sheet]

The multilayered polyester resin-coated metal sheet 100 of the present invention can be manufactured by a process (direct extrusion process) that includes extruding molten resin layers directly onto the metal substrate MP and passing them between laminating rolls for integration under pressure. Described specifically, the multilayered polyester resin-coated metal sheet 100 can be manufactured by using an upper layer resin extruder and a lower layer resin extruder, allowing resin streams from the respective extruders to merge together in a multiple multilayer die, and extruding the resins in the form of thin films through a T-die such that the lower layer resin is located on the side of the metal substrate.

However, the manufacturing method of the multilayered polyester resin-coated metal sheet 100 is not limited to the foregoing. For example, the multilayered polyester resin-coated metal sheet 100 can also be manufactured by producing a film which has the lower layer 10 and the upper layer 20, in a known manner, and then thermally bonding the film to the metal substrate MP such that the lower layer 10 is located on the side of the metal substrate MP.

[Multilayered Polyester Resin Film]

The multilayered polyester resin film in the present embodiment can be produced in the known manner as described above. For example, the multilayered polyester resin film can be obtained by using an extruder for the resin which is to be formed into the upper layer 20 and another extruder for the resin which is to be formed into the lower layer 10, allowing resin streams from the respective extruders to merge together in a multiple multilayer die, extruding the resins in the form of thin films through a T-die, and then taking up the resulting multilayered film in a known manner. The multilayered polyester resin-coated metal sheet 100 can be manufactured by using the multilayered polyester resin film of the present embodiment and thermally bonding the multilayered polyester resin film to the metal substrate MP such that the lower layer 10 is located on the side of the metal substrate MP.

[Can Lid]

With use of the above-mentioned multilayered polyester resin-coated metal sheet 100, the can lid of the present embodiment can be formed such that the side of the multilayered polyester resin-coated metal sheet 100 on which the above-mentioned lower layer 10 and upper layer 20 are formed is located on a side of an inner surface of the can lid. It is to be noted that, as the shape of the can lid of the present embodiment, an easy-open lid of the known pull-open type or the stay-on tab type can be adopted. It is also to be noted that a description is omitted here with respect to a manufacturing method of the can lid as a known method can be applied.

EXAMPLES

With use of the following examples, the present invention will next be described in further detail, although the present invention should not be limited to them. Evaluation methods of individual characteristics are as follows.
[Evaluation and Measurement Methods]
(Manufacturing Method of Multilayered Polyester Resin-Coated Metal Sheet)

Tin-free steel (TFS) of 0.22 mm thickness was used as a metal substrate. In each Example, the upper layer and lower layer resin materials presented in Table 1 were supplied to a twin-screw extruder, and with the temperatures of barrels and a T-die set at temperatures suited for the resin materials, were extruded to obtain a film, the film was laminated onto the TFS sheet heated to 250° C., followed by immediate water cooling to obtain a multilayered polyester resin-coated metal sheet. At that time, extrusion conditions were set such that the resins on an inner surface of a lid had the thicknesses presented in Table 2. After applying coating to one side of the resulting single-sided laminate material, the one side being one to serve as an outer surface of the lid, the coating was baked at 185° C. for 10 minutes.
(Manufacturing Method of can Lid)

With respect to the above-described multilayered polyester resin-coated metal sheet, a lid was formed from a blank of 95.0 mm diameter, and score processing (residual thickness: 75 µm) was applied to the lid from its outer surface, followed by rivet processing and attachment of an opening tab, whereby an EO lid was made.
(Evaluation of Openability)

On the lid obtained as described above, retort processing was conducted at 120° C. for 60 minutes. The lid was then opened by hand at a temperature around 50° C., and a visual observation was made around an opening portion to perform an evaluation. As evaluation criteria, the length of delamination between the sheet and the film at the time of lid opening (delamination length) and the maximum value of a film elongation at the opening portion were measured, and were evaluated as described below. The results are presented in Table 2.

Delamination Length
Excellent: equal to or shorter than 0.5
Good: longer than 0.5 mm but equal to or shorter than 1.0 mm
Poor: longer than 1.0 mm Film elongation
Excellent: equal to or shorter than 0.5
Good: longer than 0.5 mm but equal to or shorter than 1.0 mm
Poor: longer than 1.0 mm (Evaluation of Processability)

Processability was evaluated by a current value when a voltage of 6.30 V was applied for 4.0 seconds across the entire inner surface of the resulting can lid.
Excellent: equal to or lower than 0.01 mA Good: higher than 0.01 mA but equal to or lower than 0.5 mA
Poor: higher than 0.5 mA
<Glass Transition Temperature (Tg)>

The polyester resin (B) was melted in a differential scanning calorimeter ("DSC8500," trade name; manufactured by PerkinElmer, Inc.), followed by cooling to −50° C. at 200° C./min. An extrapolated onset temperature of glass transition observed when the temperature of the polyester resin (B) was then raised from −50° C. to 280° C. at 10° C./min was recorded as a glass transition temperature (Tg).
<Major Diameter and Minor Diameter of Soft Component Dispersed in Upper Layer>

The film was observed on a cross-section by a scanning electron microscope. Major diameters and minor diameters of the polyester-based thermoplastic elastomer or polyolefin dispersed in 10 µm squares were measured and each averaged, whereby its average major diameter and average minor diameter were determined.

Examples 1 to 11

Example 1 to Example 9 each used a thermoplastic elastomer (polytetramethylene glycol-copolymerized polybutylene terephthalate) as a soft component in the upper layer. Examples 4 to 6 and 8 each had trimellitic acid (TMA) contained as a polyfunctional component in the lower layer. Example 9 added a lubricant to the lower layer. Example 10 used a polyolefin (MFR: 0.9; melting point: 80□C; Zn-crosslinked ionomer) as a soft component in the upper layer. Example 11 adopted a three-layer structure with a PET/IA2 (polyethylene terephthalate resin copolymerized with 2 mol % of isophthalic acid) layer formed as a surface layer.

As demonstrated by the Examples, the multilayered polyester resin films, the multilayered polyester resin-coated metal sheets, and the can lids of the present invention all had both excellent openability and superb processability.

Comparative Examples 1 to 6

Comparative Examples 1 to 3 applied conventionally known two-layer films. On the other hand, Comparative Examples 4 to 6 reversed the configuration of the lower layer and the upper layer in the present invention. The multilayered polyester resin films, the multilayered polyester resin-coated metal sheets, and the can lids other than the present invention as presented in the Comparative Examples had neither openability nor processability.

TABLE 1

| | | | | Lower layer | | | | |
|---|---|---|---|---|---|---|---|---|
| | Polyester resin (A) | | | | Weight | | | |
| | Principal component | 1st copolymer component | 2nd copolymer component | Content of (A) (mass %) | average molecular weight | Other content component | Inorganic particles | Elongation at break 50° C. (%) |
| Example 1 | PET | IA (20 mol %) | — | 100.0 | 65,000 | — | — | 5.0 |
| Example 2 | PET | IA (15 mol %) | — | 100.0 | 50,000 | — | — | 5.0 |
| Example 3 | PET | IA (15 mol %) | — | 100.0 | 45,000 | — | — | 5.0 |
| Example 4 | PET | IA (15 mol %) | TMA (0.1 mol %) | 100.0 | 42,000 | — | — | 5.0 |

TABLE 1-continued

|  |  |  |  |  |  |  |  |  |
|---|---|---|---|---|---|---|---|---|
| Example 5 | PET | IA (10 mol %) | TMA (0.3 mol %) | 100.0 | 43,000 | — | — | 5.0 |
| Example 6 | PET | IA (15 mol %) | TMA (0.3 mol %) | 100.0 | 52,000 | — | — | 5.0 |
| Example 7 | PET | IA (2 mol %) | — | 100.0 | 60,000 | — | — | 5.0 |
| Example 8 | PET | IA (15 mol %) | TMA (0.1 mol %) | 100.0 | 45,000 | — | — | 5.0 |
| Example 9 | PET | IA (15 mol %) | — | 100.0 | 42,000 | — | SiO2 (3 wt %) | 5.0 |
| Example 10 | PET | IA (15 mol %) | — | 100.0 | 45,000 | — | — | 5.0 |
| Example 11 | PET | IA (15 mol %) | — | 100.0 | 45,000 | — | — | 5.0 |
| Comparative example 1 | PET | — | — | 100.0 | 60,000 | — | — | — |
| Comparative example 2 | PET | IA (15 mol %) | — | 100.0 | 65,000 | — | — | — |
| Comparative example 3 | PET | IA (15 mol %) | — | 100.0 | 65,000 | — | — | 5.0 |
| Comparative example 4 | PET | IA (15 mol %) | — | 100.0 | 40,000 | — | — | 5.0 |
| Comparative example 5 | PET | IA (15 mol %) | — | 100.0 | 40,000 | — | — | 5.0 |
| Comparative example 6 | PET | IA (15 mol %) | — | 95.0 | 45,000 | PTMG copolymerized PBT (10 wt %) | — | 150.0 |
| Comparative example 7 | PET | IA (15 mol %) | — | 90.0 | 45,000 | Ionomer (10 wt %) | — | 200.0 |
| Comparative example 8 | PET | IA (15 mol %) | — | 90.0 | — | — | — | — |

| | Upper layer | | | | | | | |
|---|---|---|---|---|---|---|---|---|
| | Polyester resin (B) | | | Soft component (C) | | | | Surface layer |
| | Kind | Tg1 (° C.) | Content (mass %) | Kind | Content weight (mass %) | Average major diameter | Average minor diameter | Kind | Thickness (μm) |
| Example 1 | PET | 75 | 95.0 | PTMG copolymerized PBT | 10.0 | 0.1 | 0.02 | — | — |
| Example 2 | PET | 71 | 95.0 | PTMG copolymerized PBT | 5.0 | 0.1 | 0.02 | — | — |
| Example 3 | PET/IA15 | 71 | 90.0 | PTMG copolymerized PBT | 10.0 | 0.15 | 0.02 | — | — |
| Example 4 | PET | 75 | 95.0 | PTMG copolymerized PBT | 5.0 | 0.1 | 0.02 | — | — |
| Example 5 | PET | 75 | 90.0 | PTMG copolymerized PBT | 10.0 | 0.15 | 0.02 | — | — |
| Example 6 | PET/IA2 | 73 | 80.0 | PTMG copolymerized PBT | 20.0 | 0.18 | 0.03 | — | — |
| Example 7 | PET/IA2 | 73 | 70.0 | PTMG copolymerized PBT | 30.0 | 0.2 | 0.05 | — | — |
| Example 8 | PET/IA2 | 73 | 98.0 | PTMG copolymerized PBT | 2.0 | 0.08 | 0.05 | — | — |
| Example 9 | PET | 75 | 90.0 | PTMG copolymerized PBT | 10.0 | 0.15 | 0.02 | — | — |
| Example 10 | PET/IA15 | 71 | 95.0 | Ionomer | 10.0 | 3.0 | 0.5 | — | — |
| Example 11 | PET/IA15 | 71 | 90.0 | PTMG copolymerized PBT | 10.0 | 0.15 | 0.02 | IA (5.0 mol %) | 2.0 |
| Comparative example 1 | PET/IA2 | 73 | 100.0 | — | — | — | — | — | — |
| Comparative example 2 | PET | 75 | 99.5 | PTMG copolymerized PBT | 0.5 | — | — | — | — |
| Comparative example 3 | PET | 75 | 40.0 | PTMG copolymerized PBT | 60 | — | — | — | — |
| Comparative example 4 | PET | 75 | 100.0 | PE-PP | 15 | 15 | 3 | — | — |
| Comparative example 5 | PET | 75 | 70.0 | PBT | 30 | — | — | — | — |

TABLE 1-continued

| | | | | | | | | | |
|---|---|---|---|---|---|---|---|---|---|
| Comparative example 6 | PET/IA15 | 71 | 100.0 | — | — | — | — | — | — |
| Comparative example 7 | PET/IA5 | 73 | 100.0 | — | — | — | — | — | — |
| Comparative example 8 | PET | 75 | 90.0 | PTMG copolymerized PBT | 10.0 | 0.15 | 0.02 | — | — |

PET/IA2: Polyethylene terephthalate resin copolymerized with 2 mol % of isophthalic acid
PET/IA5: Polyethylene terephthalate resin copolymerized with 5 mol % of isophthalic acid
PET/IAL5: Polyethylene terephthalate resin copolymerized with 15 mol % of isophthalic acid
PTMG copolymerized PBT: Polybutylene terephthalate copolymerized with 56 wt % of polytetramethylene glycol (thermoplastic elastomer)
Ionomer: MFR 0.9. melting point 80° C., Zn-crosslinked (polyolefin)

TABLE 2

| | Upper layer + lower layer | | | Evaluation | | |
|---|---|---|---|---|---|---|
| | | Film thickness | Film thickness ratio (upper | Openability | | |
| | Upper layer ΔTg | (μm) (upper layer + lower layer) | layer/lower layer) *(upper layer/lower layer/surface layer) only in Ex. 11 | Delamination length (mm) | Film elongation (mm) | Processability |
| Example 1 | 0.5 | 30 | 3/1 | Excellent | Excellent | Excellent |
| Example 2 | 0.5 | 30 | 3/1 | Excellent | Excellent | Excellent |
| Example 3 | 0.8 | 30 | 1/3 | Excellent | Excellent | Good |
| Example 4 | 0.5 | 20 | 5/1 | Excellent | Excellent | Excellent |
| Example 5 | 0.8 | 20 | 3/1 | Excellent | Excellent | Excellent |
| Example 6 | 0.8 | 30 | 1/3 | Good | Good | Excellent |
| Example 7 | 1 | 30 | 1/3 | Good | Good | Excellent |
| Example 8 | 0.5 | 20 | 1/3 | Excellent | Excellent | Good |
| Example 9 | 0.8 | 20 | 1/1 | Excellent | Excellent | Excellent |
| Example 10 | 0.5 | 20 | 3/1 | Good | Good | Excellent |
| Example 11 | | 30 | 1/5/2 | Excellent | Excellent | Excellent |
| Comparative example 1 | — | 30 | 1/3 | Poor | Good | Poor |
| Comparative example 2 | 0.5 | 30 | 3/1 | Excellent | Excellent | Poor |
| Comparative example 3 | 1.5 | 30 | 3/1 | Poor | Poor | Excellent |
| Comparative example 4 | 0.5 | 20 | 3/1 | Poor | Poor | Excellent |
| Comparative example 5 | 20 | 20 | 3/1 | Poor | Poor | Excellent |
| Comparative example 6 | — | 20 | 1/1 | Poor | Poor | Excellent |
| Comparative example 7 | — | 20 | 1/4 | Poor | Poor | Excellent |
| Comparative example 8 | 0.8 | 20 | 1/10 | Excellent | Excellent | Poor |

INDUSTRIAL APPLICABILITY

The present invention can satisfy product requirements while meeting complex and severe can-making processing, and can suitably be used in the field of metal processing.

REFERENCE SIGN LIST

MP: Metal substrate
100: Multilayered polyester resin-coated metal sheet
10: Lower layer
20: Upper layer
30: Surface layer
200: Multilayered polyester resin layer

The invention claimed is:

1. A multilayered polyester resin-coated metal sheet comprising:
a metal substrate; and
a multilayered polyester resin layer formed on at least one side of the metal substrate,
wherein the multilayered polyester resin layer has, in an order from a side of the metal substrate,
a lower layer made from a polyester resin (A) modified with 2 to 30 mol % of a first copolymerizable component, and
an upper layer containing a polyester resin (B) and a soft component (C) incompatible with the polyester resin (B), the soft component (C) being a polyester-based thermoplastic elastomer dispersed in an island form in the polyester resin (B), the polyester-based thermoplastic elastomer being contained at a content of 2 to 50 mass % when the polyester resin (B) and the polyester-based thermoplastic elastomer are assumed to amount to 100 mass % in total.

2. The multilayered polyester resin-coated metal sheet according to claim 1, wherein:
the polyester resin (B) is a thermoplastic polyester resin having a glass transition temperature (Tg1) of 60° C. or higher but 90° C. or lower;
and
an absolute value ΔTg of a difference between the glass transition temperature (Tg1) of the polyester resin (B)

and a glass transition temperature (Tg2) of the upper layer satisfies the following equation (1):

$$\Delta Tg < 0.5 \times W \tag{1}$$

where W means the content (mass %) of the soft component (C) in the upper layer.

3. The multilayered polyester resin-coated metal sheet according to claim 1, wherein the soft component (C) is dispersed in an island form in the polyester resin (B), and the soft component (C) dispersed in the island form has an average major diameter of 0.1 to 5.0 μm and an average minor diameter of 0.01 to 2 μm.

4. The multilayered polyester resin-coated metal sheet according to claim 1, wherein the polyester resin (A) is principally made of polyethylene terephthalate, and contains isophthalic acid as the first copolymerizable component.

5. The multilayered polyester resin-coated metal sheet according to claim 4, wherein the lower layer further contains 0.01 to 0.5 mol % of a polyfunctional component.

6. The multilayered polyester resin-coated metal sheet according to claim 1, wherein the polyester resin (A) has a weight average molecular weight of 40000 to 80000.

7. The multilayered polyester resin-coated metal sheet according to claim 1, wherein inorganic particles having an average particle size of 0.2 to 5.0 μm are contained at 0.1 to 5.0 mass % in the polyester resin (A).

8. The multilayered polyester resin-coated metal sheet according to claim 1, wherein the upper layer and the lower layer have a total thickness of 10 to 50 μm, the upper layer has a thickness of 5 to 40 μm, and the lower layer has a thickness of 5 to 30 μm.

9. The multilayered polyester resin-coated metal sheet according to claim 1, wherein the lower layer has an elongation at break of 50% or less in an environment of 50° C. after heat treatment at 185° C. for 10 minutes.

10. The multilayered polyester resin-coated metal sheet according to claim 1, further comprising:
a surface layer formed on a side of the upper layer, the side being opposite to the side of the metal substrate.

11. A can lid comprising the multilayered polyester resin-coated metal sheet according to claim 1.

12. A multilayered polyester resin film comprising:
a lower layer formed on at least one side of a metal substrate and made from a polyester resin (A) modified with 2 to 30 mol % of a first copolymerizable component, and
an upper layer that is formed on the lower layer and that contains a polyester resin (B) and a soft component (C) incompatible with the polyester resin (B), the soft component (C) being a polyester-based thermoplastic elastomer dispersed in an island form in the polyester resin (B), the soft component (C) being contained at a content of 2 to 50 mass % when the polyester resin (B) and the polyester-based thermoplastic elastomer are assumed to amount to 100 mass % in total.

13. A can lid comprising the multilayered polyester resin film according to claim 12.

* * * * *